United States Patent
Shiau et al.

(10) Patent No.: US 12,332,517 B2
(45) Date of Patent: Jun. 17, 2025

(54) OPTICAL FILM SET AND DISPLAY DEVICE

(71) Applicant: Coretronic Corporation, Hsin-Chu (TW)

(72) Inventors: Tzeng-Ke Shiau, Hsin-Chu (TW); Ying-Shun Syu, Hsin-Chu (TW); Bo-Chih Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/784,914

(22) Filed: Jul. 26, 2024

(65) Prior Publication Data
US 2025/0044642 A1 Feb. 6, 2025

(30) Foreign Application Priority Data
Aug. 4, 2023 (CN) .......................... 202310975033.7

(51) Int. Cl.
*G02F 1/1333* (2006.01)
*G02F 1/1335* (2006.01)

(52) U.S. Cl.
CPC .............................. *G02F 1/133607* (2021.01)

(58) Field of Classification Search
CPC .............................................. G02F 1/133607
USPC ....................................................... 362/97.2
See application file for complete search history.

(56) References Cited

U.S. PATENT DOCUMENTS

| | | | |
|---|---|---|---|
| 5,396,350 A * | 3/1995 | Beeson | G02B 6/0053 359/251 |
| 7,804,564 B2 | 9/2010 | Min et al. | |
| 11,360,257 B1 * | 6/2022 | Kuo | G02B 6/0065 |
| 11,982,904 B2 * | 5/2024 | Jin | G02B 5/045 |
| 2011/0088299 A1 * | 4/2011 | Yoshimura | G09F 13/0409 40/541 |
| 2015/0029745 A1 * | 1/2015 | Asano | G02B 6/005 362/625 |
| 2023/0288753 A1 * | 9/2023 | Shiau | G02F 1/133615 |

FOREIGN PATENT DOCUMENTS

| | | |
|---|---|---|
| TW | 200916901 | 4/2009 |
| TW | 202202917 | 1/2022 |
| TW | 202229946 | 8/2022 |

* cited by examiner

*Primary Examiner* — Christopher M Raabe
(74) *Attorney, Agent, or Firm* — JCIPRNET

(57) ABSTRACT

An optical film set is disclosed. The optical film set including an optical film. The optical film includes a base and multiple light-guiding structures. The base has a light entrance surface and a light exit surface opposite to each other. The light-guiding structures are disposed on the light entrance surface of the base. Each of the light-guiding structures has two light-guiding surfaces opposite to each other. An included angle is between the each of the two light-guiding surfaces and a normal of the light entrance surface, and an angle range of the included angle is larger than 0 degrees and less than 25 degrees. A display device having the optical film set is also disclosed.

15 Claims, 7 Drawing Sheets

OPTICAL FILM SET AND DISPLAY DEVICE

CROSS-REFERENCE TO RELATED APPLICATION

This application claims the priority benefit of China application serial no. 202310975033.7, filed on Aug. 4, 2023. The entirety of the above-mentioned patent application is hereby incorporated by reference herein and made a part of this specification.

BACKGROUND

Technical Field

This disclosure relates to an optical film set and a display device.

Description of Related Art

Generally, the front-viewing (zero angle of view, zero AOV) luminance gain of a display device is accomplished by configuring a diffusing sheet and one or two prism sheets thereon. However, the above structure achieves limited luminance gain mainly because the above diffusing sheet and the prism sheet have the effect of light gathering. That is, there is no optical coordination between the sheets.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an optical film set with good front-viewing luminance gain. The disclosure further provides a display device using the optical film set, which has good optical performance.

Other purposes and advantages of the disclosure can be further understood from the technical features disclosed by the disclosure.

In order to achieve one, part, or all of the above purposes or other purposes, according to an embodiment of the disclosure, an optical film set is provided, including a first optical film. The first optical film includes a first base and multiple first light-guiding structures. The first base has a first light entrance surface and a first light exit surface opposite to each other. The first light-guiding structures are disposed on the first light entrance surface of the first base. Each of the first light-guiding structures includes two first light-guiding surfaces opposite to each other. A first included angle is between each of the two first light-guiding surfaces and a normal of the first light entrance surface, and an angle of the first included angle is greater than 0 degrees and less than 25 degrees.

According to another embodiment of the disclosure, a display device is provided, including a liquid crystal display panel and a backlight module. The backlight module is stacked with the liquid crystal display panel and includes an optical film set. The optical film set includes a first base and multiple first light-guiding structures. The first base has a first light entrance surface and a first light exit surface opposite to each other. The first light-guiding structures are disposed on the first light entrance surface of the first base. Each of the first light-guiding structures includes two first light-guiding surfaces opposite to each other. A first included angle is between each of the two first light-guiding surfaces and a normal of the first light entrance surface, and an angle range of the first included angle is greater than 0 degrees and less than 25 degrees. The liquid crystal display panel is disposed on a side of the first light exit surface away from the first light entrance surface.

According to yet another embodiment of the disclosure, a display device is provided, including a self-luminous display panel and an optical film set. The optical film set is disposed on a display surface of the self-luminous display panel and includes a first base and multiple first light-guiding structures. The first base has a first light entrance surface and a first light exit surface opposite to each other. The first light-guiding structures are disposed on the first light entrance surface of the first base. Each of the first light-guiding structures includes two first light-guiding surfaces opposite to each other. A first included angle is between each of the two first light-guiding surfaces and a normal of the first light entrance surface, and an angle of the first included angle is greater than 0 degrees and less than 25 degrees. The self-luminous display panel is disposed on a side of the first light entrance surface away from the first light exit surface.

Based on the above, the optical film set provided by the embodiments of the disclosure includes a base and multiple light-guiding structures. Each of the light-guiding structures includes two light-guiding surfaces opposite to each other. An included angle is between each of the first light-guiding surfaces and a normal of the light entrance surface, and an angle of the included angle is greater than 0 degrees and less than 25 degrees. A backlight module configured with the optical film set may maintain the travelling direction of front-viewing (zero AOV) light of a backlight source, and cause oblique light of the backlight source to approach in a front-viewing direction. A self-luminous display device configured with the optical film set may maintain the travelling direction of front-viewing light of the self-luminous display panel, and cause oblique light to be recycled back to the self-luminous display panel, and then, after being reflected by a reflective member inside the self-luminous display panel, to be emitted in a direction closer to the front-viewing direction.

Other objectives, features and advantages of the disclosure will be further understood from the further technological features disclosed by the embodiments of the disclosure where there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings, and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
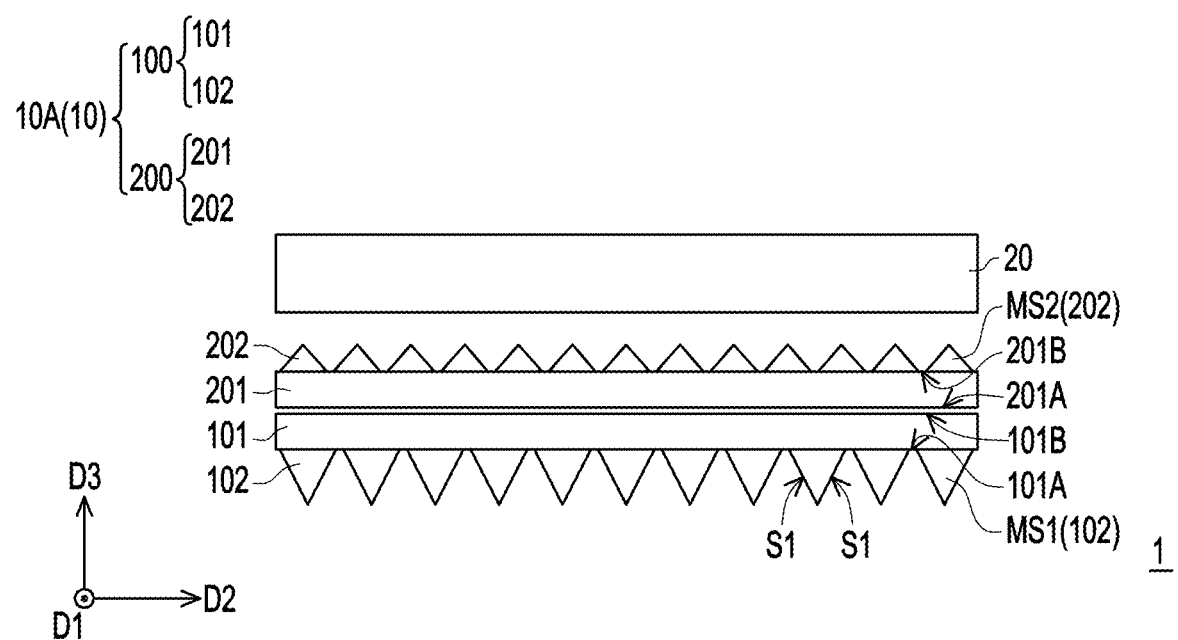
FIG. 1A is a schematic diagram of a display device according to an embodiment of the disclosure.
Figure 1B:
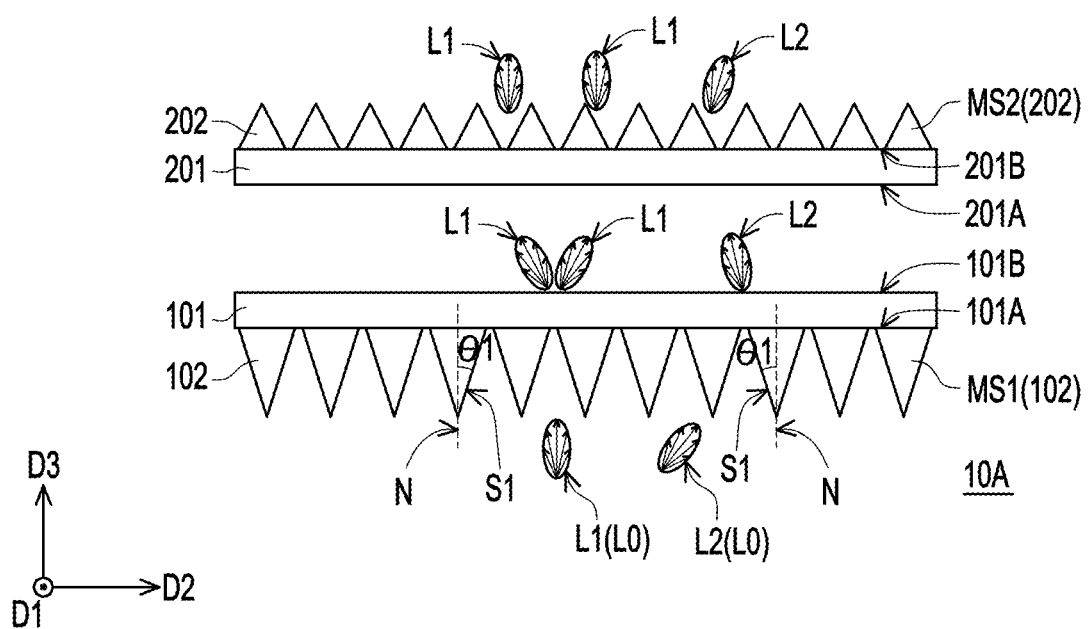
FIG. 1B is a schematic diagram of an optical film set according to an embodiment of the disclosure.

Referring to FIG. 1A and FIG. 1B, FIG. 1A is a schematic diagram of a display device according to an embodiment of the disclosure, and FIG. 1B is a schematic diagram of an optical film of FIG. 1A.

A display device 1 includes a liquid crystal display panel 20 and a backlight module 10. The backlight module 10 includes a backlight source (not shown) and an optical film set 10A, and is stacked with the liquid crystal display panel 20. The backlight source is, for example, a direct type backlight source or a side incident type backlight source. The side incident type backlight source includes a light-guiding plate and a light-emitting element located on one side of the light-guiding plate. The backlight source is used as a plane light source to provide backlight L0, as shown in FIG. 1B. The optical film set 10A includes a first optical film 100. The first optical film 100 includes a first base 101 and a first light-guiding layer 102. The first light-guiding layer 102 includes multiple first light-guiding structures MS1. Each of the first light-guiding structures MS1 is, for example, a prismatic structure having a triangular shape in a plane formed by a second direction D2 and a third direction D3, as shown in FIG. 1A. The first base 101 has a first light entrance surface 101A and a first light exit surface 101B opposite to each other. A backlight source of the backlight module 10 is disposed on a side of the first light entrance surface 101A away from the first light exit surface 101B, and the liquid crystal display panel 20 is disposed on a side of the first light exit surface 101B away from the first light entrance surface 101A. In other words, the optical film set 10A is disposed between the backlight source and the liquid crystal display panel 20.

The first light-guiding structures MS1 are disposed on the first light entrance surface 101A of the first base 101. The each of the first light-guiding structures MS1 includes two first light-guiding surfaces S1 opposite to each other. The two first light-guiding surfaces S1 of the each of the first light-guiding structures MS1 are connected to each other at a side away from the first light entrance surface 101A, and a first included angle θ1 is between each of the two first light-guiding surfaces S1 and a normal N of the first light entrance surface 101A.

In the embodiment shown in FIG. 1A, the optical film set 10A of the display device 1 further includes a second optical film 200. The second optical film 200 overlaps with the first optical film 100 and includes a second base 201 and a second light-guiding layer 202. The second light-guiding layer 202 includes multiple second light-guiding structures MS2 is, and each of the second light-guiding structures MS2 is, for example, a prismatic structure having a triangular shape in a plane formed by a second direction D2 and a third direction D3, as shown in FIG. 1A. The each of the first light-guiding structures MS1 and the each of the second light-guiding structures MS2 is a strip structure extending toward the first direction D1. The second base 201 has a second light entrance surface 201A and a second light exit surface 201B opposite to each other. The second light entrance surface 201A is located between the first light exit surface 101B and the second light exit surface 201B. The second light-guiding structures MS2 are disposed on the second light exit surface 201B, that is, the second optical film 200 is disposed between the first optical film 100 and the liquid crystal display panel 20. However, the disclosure is not limited thereto. In some embodiments, the optical film set 10A of the display device 1 includes the first optical film 100 but does not include the second optical film 200. In some embodiments, an included angle is between an extension direction of the each of the first light-guiding structures MS1 and an extension direction of the each of the second light-guiding structures MS2, and an angle range of the included angle is greater than or equal to 1 degree and less than or equal to 10 degrees. Under the above structural configuration, light field energy distribution of the backlight L0 after the backlight L0 passing through the first optical film 100 and the second optical film 200 may alter.

Next, please refer to FIG. 1B. In the backlight module 10 configured with the first optical film 100 and the second optical film 200, the backlight L0 coming from the backlight source includes front-viewing light L1 and oblique light L2. A main transmission path of the backlight L0 passes through the first light-guiding layer 102, the first base 101, the second base 201, and the second light-guiding layer 202 in sequence. It should be further explained that an angle of an included angle between the front-viewing light L1 of the backlight L0 emitted by the backlight source and the normal N of the first light entrance surface 101A ranges from 0 to 5 degrees in the second direction D2, and an angle of an included angle between the oblique light L2 and the normal N of the first light entrance surface 101A ranges from 5 to 30 degrees in the second direction D2.

Since the first light-guiding structures MS1 of the first optical film 100 are disposed on the first light entrance surface 101A of the first base 101, the first light-guiding structures MS1 extend toward the first direction D1, and the first light-guiding surface S1 of the each of the first light-guiding structures MS1 is inclined with respect to the normal N of the first light entrance surface 101A, after the front-viewing light L1 passes through the first light-guiding layer 102 and the first base 101, the front-viewing light L1 emitted from the first light exit surface 101B deviates substantially from the normal N of the first light entrance surface 101A in the second direction D2. For example, an angle range of the included angle between the front-viewing light L1 emitted from the first light exit surface 101B and the normal N of the first light entrance surface 101A is greater than 15 degrees in the second direction D2. In other words, the angle range of the included angle between the front-viewing light L1 emitted from the first light exit surface 101B and the normal N of the first light entrance surface 101A is greater than an angle range of the included angle between the front-viewing light L1 entering the first light entrance surface 101A and the normal N. Further, after the oblique light L2 passes through the first light-guiding layer 102 and the first base 101, an angle range of the included angle between the oblique light L2 and the normal N of the first light entrance surface 101A becomes smaller in the second direction D2. In other words, the angle range of the included angle between the oblique light L2 emitted from the first light exit surface 101B and the normal N of the first light entrance surface 101A is smaller than the angle range of the included angle between the oblique light L2 entering the first light entrance surface 101A and the normal N of the first light entrance surface 101A. In addition, since the second light-guiding structures MS2 of the second optical film 200 are disposed on the second light exit surface 201B of the second base 201, and the second light-guiding structures MS2 extend toward the first direction D1, after the front-viewing light L1 passes through the second base 201 and the second light-guiding layer 202, an angle range of the included angle between the front-viewing light L1 emitted from the second light exit surface 201B and the normal N of the first light entrance surface 101A is between 5 and 15 degrees in the second direction D2. In other words, an angle range of the included angle between the front-viewing light L1 emitted from the second light exit surface 201B and the normal N of the first light entrance surface 101A is smaller than an angle range of the included angle between the front-viewing light L1 emitted from the first light exit surface 101B and the normal N of the first light entrance surface 101A, and after the oblique light L2 passes through the second base 201 and the second light-guiding layer 202, an angle range of the included angle between the oblique light L2 emitted from the second light exit surface 201B and the normal N of the first light entrance surface 101A is smaller, in the second direction D2, than the included angle between the oblique light L2 emitted from the first light exit surface 101B and the normal N of the first light entrance surface 101A. In other words, after the oblique light L2 sequentially passes through the first optical film 100 and the second optical film 200, light having a travelling direction closer to the front-viewing direction may be formed. That is, by arranging the optical film set 10A as shown in FIG. 1B in the backlight module 10, the front-viewing light L1 and the oblique light L2 in the backlight source may be converged and concentrated in the front-viewing direction of the first light entrance surface 101A, so as to effectively increase the front-viewing luminance.

Figure 1C:
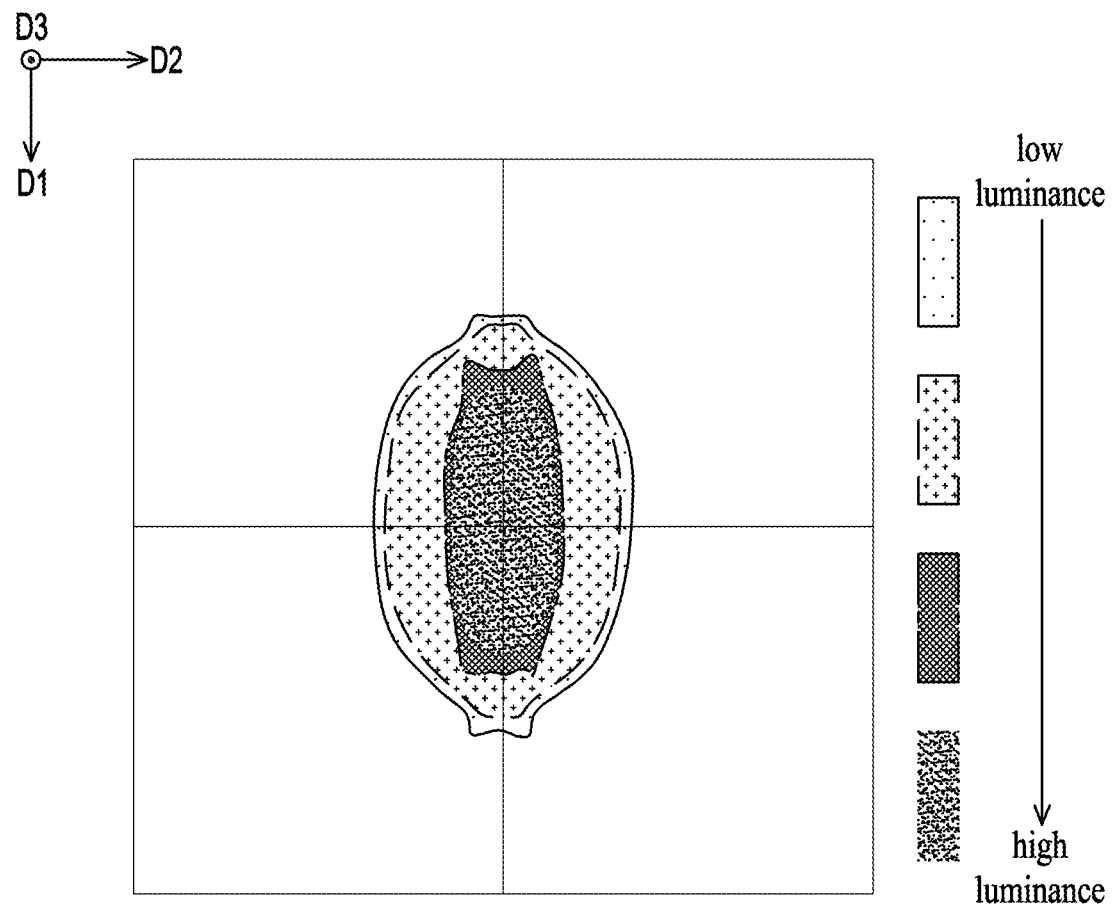
FIG. 1C is a schematic diagram of a light field of backlight passing through an optical film set according to an embodiment of the disclosure.

Specifically, FIG. 1C is a schematic diagram of a light field of a backlight module configured with the optical film set 10A according an embodiment of the disclosure. It should be noted that in FIG. 1C, areas filled with the same grid pattern indicate areas with similar light field energy values, and areas with a denser distribution of nets in the grid pattern indicate areas with higher light field energy values (i.e., areas with higher luminance values). Based on the structural characteristics of the first optical film 100 and the second optical film 200 in this embodiment, when the front-viewing light L1 passes through the first optical film 100, the light field energy distribution of the front-viewing light L1 in the second direction D2 will be separated. When the front-viewing light L1 passes through the second optical film 200, the light field energy distribution of the front-viewing light L1 in the second direction D2 may be converged; in addition, when the oblique light L2 passes through the first optical film 100, the light field energy distribution of the oblique light L2 in the second direction D2 is converged, and when the oblique light L2 passes through the second optical film 200, the oblique light L2 in the second direction D2 is more converged. Based on the above, after the front-viewing light L1 and the oblique light L2 pass through the first optical film 100 and the second optical film 200, the front-viewing luminance gain effect occurs in the light distribution in the second direction D2. Compared with a backlight module with only a backlight source (without any optical film), in this embodiment, the luminance gain of the backlight L0 emitted from the backlight source is 1.85 times after passing through the optical film set 10A. According to some embodiments of the disclosure, when an angle range of the included angle θ1 between each of the first light-guiding surfaces S1 and the normal N of the first base 101 is greater than 0 degrees and less than 25 degrees, the optical film set 10A may provide good optical effects. To further illustrate, when the angle range of the included angle θ1 between the each of the first light-guiding surfaces S1 and the normal N of the base 101 is greater than 5 degrees and less than 20 degrees, the optical film set 10A has better optical effects. In some embodiments, the first light-guiding layer 102, the first base 101, the second base 201, the second light-guiding layer 202, or a combination thereof can be fogged to avoid Mura fringes appearing in the image of the display device 1.

In order to fully illustrate various implementation aspects of the disclosure, other embodiments of the disclosure will be described below. It should be noted here that the following embodiments follow the numeral references and part of the content of the foregoing embodiments, where the same numeral references are used to represent the same or similar elements, and descriptions of the same technical content are omitted. For descriptions of omitted parts, reference may be made to the foregoing embodiments and will not be repeated in the following embodiments.

Figure 2A:
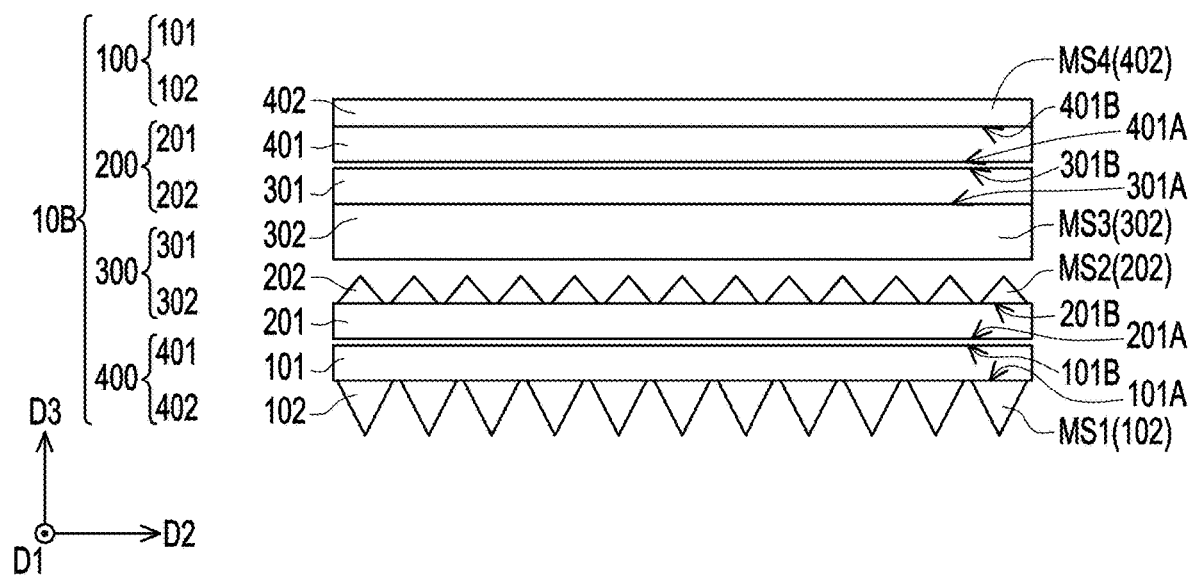
FIG. 2A is a schematic plan diagram of an optical film set in a plane formed by a second direction and a third direction according to an embodiment of the disclosure.
Figure 2B:
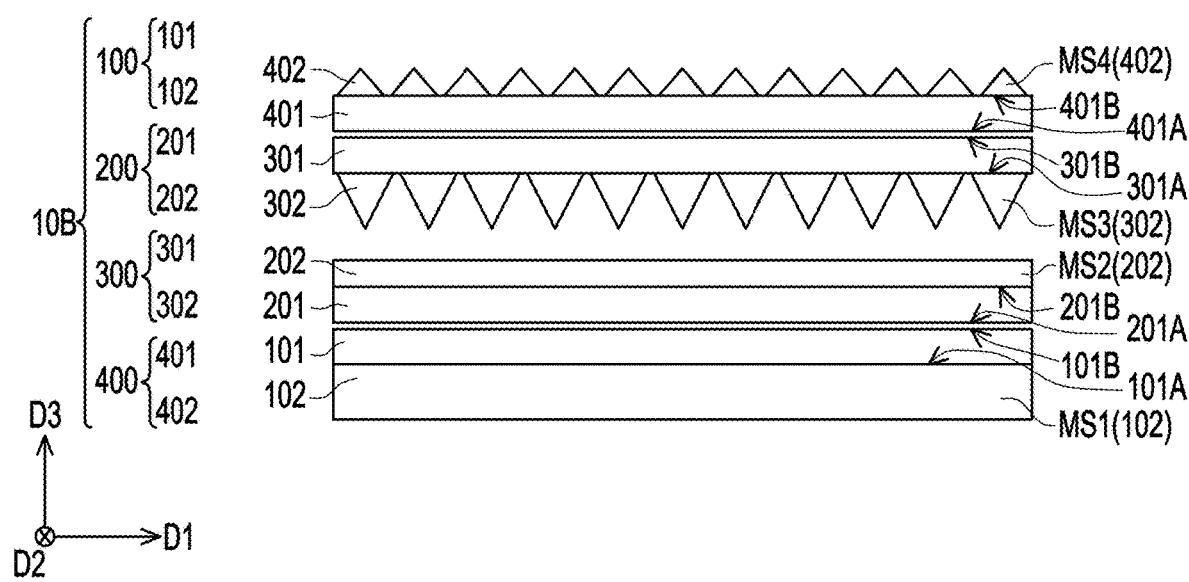
FIG. 2B is a schematic plan diagram of an optical film set in a plane formed by a first direction and a third direction according to an embodiment of the disclosure.
Figure 2C:
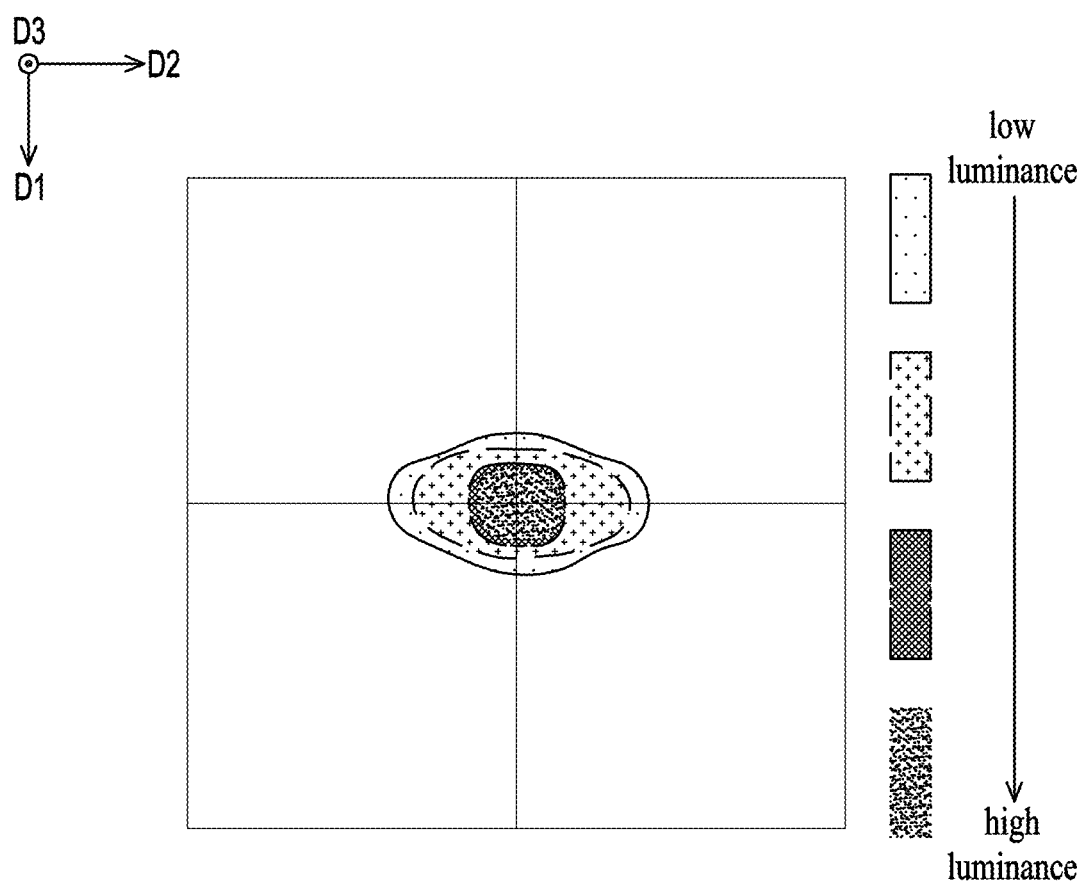
FIG. 2C is a schematic diagram of a light field of backlight passing through an optical film set according to an embodiment of the disclosure.

Next, please refer to FIG. 2A to FIG. 2C. FIG. 2A is a schematic plan diagram of an optical film set in a plane formed by a second direction D2 and a third direction D3 according to an embodiment of the disclosure. FIG. 2B is a schematic plan diagram of an optical film set in a plane formed by a first direction D1 and a third direction D3 according to an embodiment of the disclosure. FIG. 2C is a schematic diagram of a light field of backlight passing through an optical film set configured with the optical film set of FIG. 2A according to an embodiment of the disclosure. It should be noted that FIG. 2A to FIG. 2C are the same embodiment.

The display device of this embodiment is different from the display device 1 shown in FIG. 1A in that an optical film set 10B further includes a third optical film 300 and a fourth optical film 400 as compared to the optical film set 10A. The third optical film 300 and the second optical film 200 overlap each other, and the third optical film 300 includes a third base 301 and a third light-guiding layer 302. The third light-guiding layer 302 includes multiple third light-guiding structures MS3, and each of the third light-guiding structure MS3 is, for example, a prismatic structure having a triangular shape in a plane formed by a first direction D1 and a third direction D3. The third base 301 has a third light entrance surface 301A and a third light exit surface 301B opposite to each other. The third light entrance surface 301A is located between the second light exit surface 201B and the third light exit surface 301B. The third light-guiding structures MS3 are disposed on the third light entrance surface 301A of third base 301. The each of the third light-guiding structures MS3 includes two third light-guiding surfaces S3 opposite to each other, and the two third light-guiding surfaces S3 of the each of the third light-guiding structures MS3 are connected to each other at a side away from the third light entrance surface 301A. An included angle is between each of the two third light-guiding surfaces S3 of the each of the third light-guiding structures MS3 and a normal (not shown) of the third light entrance surface 301A, and an angle range of the included angle is greater than 0 degrees and less than 25 degrees. The configuration relationship of the included angle between the each of the two third light-guiding surfaces S3 of the each of the third light-guiding structures MS3 and the normal of the third base 301 is the same as the configuration relationship of the included angle θ1 between the each of the two first light-guiding surfaces S1 shown in FIG. 1 and the normal N of the first base 101, and therefore will not be repeated in the following.

The fourth optical film 400 and the third optical film 300 overlap each other, and the fourth optical film 400 includes a fourth base 401 and a fourth light-guiding layer 402. The fourth light-guiding layer 402 includes multiple fourth light-guiding structures MS4, and each of the fourth light-guiding structures MS4 is, for example, a prismatic structure having a triangular shape in a plane formed by a first direction D1 and a third direction D3. The fourth base 401 has a fourth light entrance surface 401A and a fourth light exit surface 401B. The fourth light entrance surface 401A is located between the third light exit surface 301B and the fourth light exit surface 401B. The fourth light-guiding structures MS4 are disposed on the fourth light exit surface 401B. It should be further explained that in this embodiment, the third optical film 300 and the fourth optical film 400 are located between the second optical film 200 and the liquid crystal display panel 20. The third optical film 300 is located between the second optical film 200 and the fourth optical film 400, and the fourth optical film 400 is located between the third optical film 300 and the liquid crystal display panel 20.

In the embodiment shown in FIG. 2A and FIG. 2B, the each of the first light-guiding structures MS1 and the each of the second light-guiding structures MS2 are strip structures extending toward the first direction D1, the each of the third light-guiding structures MS3 and the each of the fourth light-guiding structure MS4 are strip structures extending toward the second direction D2, and the first direction D1 is orthogonal to the second direction D2. However, the disclosure is not limited thereto. According to some embodiments of the disclosure, an included angle between the first direction D1 and the second direction D2 is within a range of 70 degrees to 110 degrees.

Referring again to FIG. 2C, FIG. 2C is a schematic diagram of a light field of a backlight module configured with the optical film set of FIG. 2A. In FIG. 2C, areas filled with the same grid pattern indicate areas with similar light field energy values, and areas with a denser distribution of nets in the grid pattern indicate areas with higher light field energy values (i.e., areas with higher luminance values). In this embodiment, since the third optical film 300 and the fourth optical film 400 are further disposed on the second optical film 200, and the third light-guiding structure MS3 and the fourth light-guiding structure MS4 extend toward the second direction D2, the light field energy distribution of the front-viewing light L1 and the oblique light L2 in the first direction D1 may be further converged, so as to increase the front-viewing luminance of the light distribution of the backlight L0 in the first direction D1. Compared with a backlight module with only a backlight source (without any optical film), in this embodiment, the luminance gain of the backlight L0 emitted from the backlight source is 2.62 times after passing through the optical film set 10B.

Figure 3A:
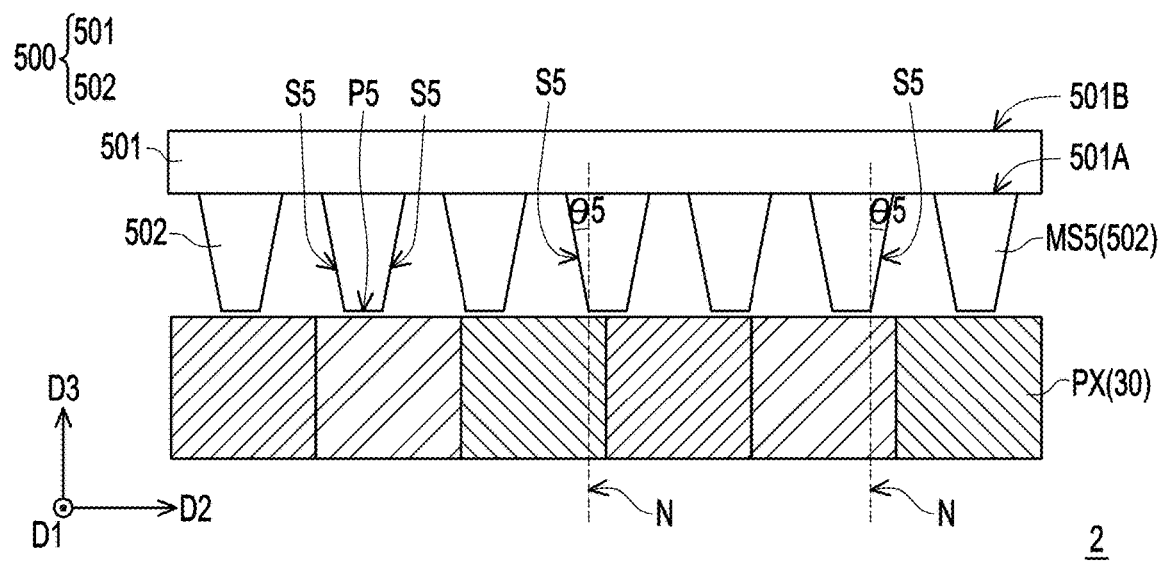
FIG. 3A is a schematic diagram of a display device according to an embodiment of the disclosure.
Figure 3B:
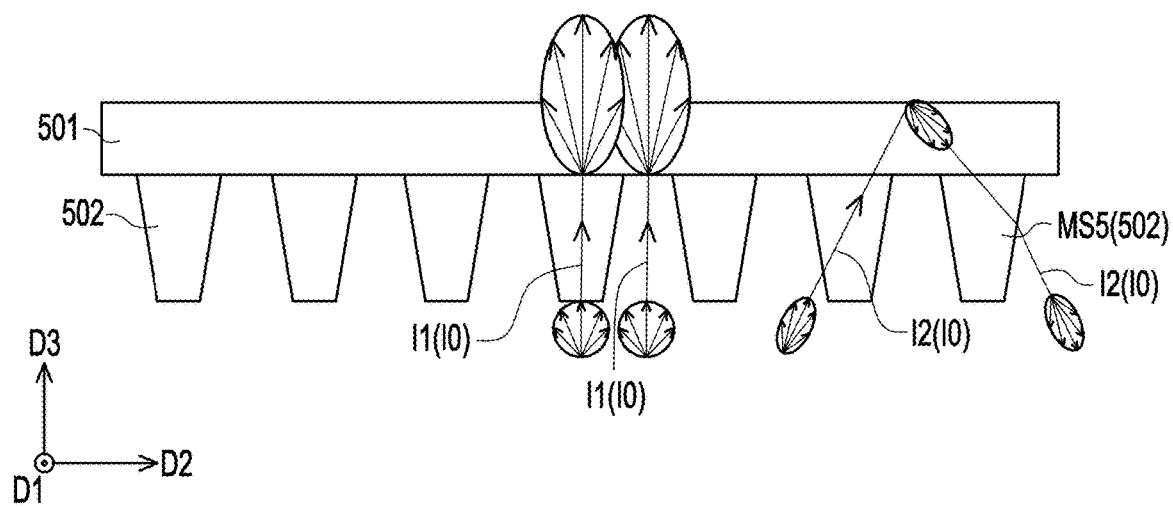
FIG. 3B is a schematic diagram of an optical film according to an embodiment of the disclosure.
Figure 3C:
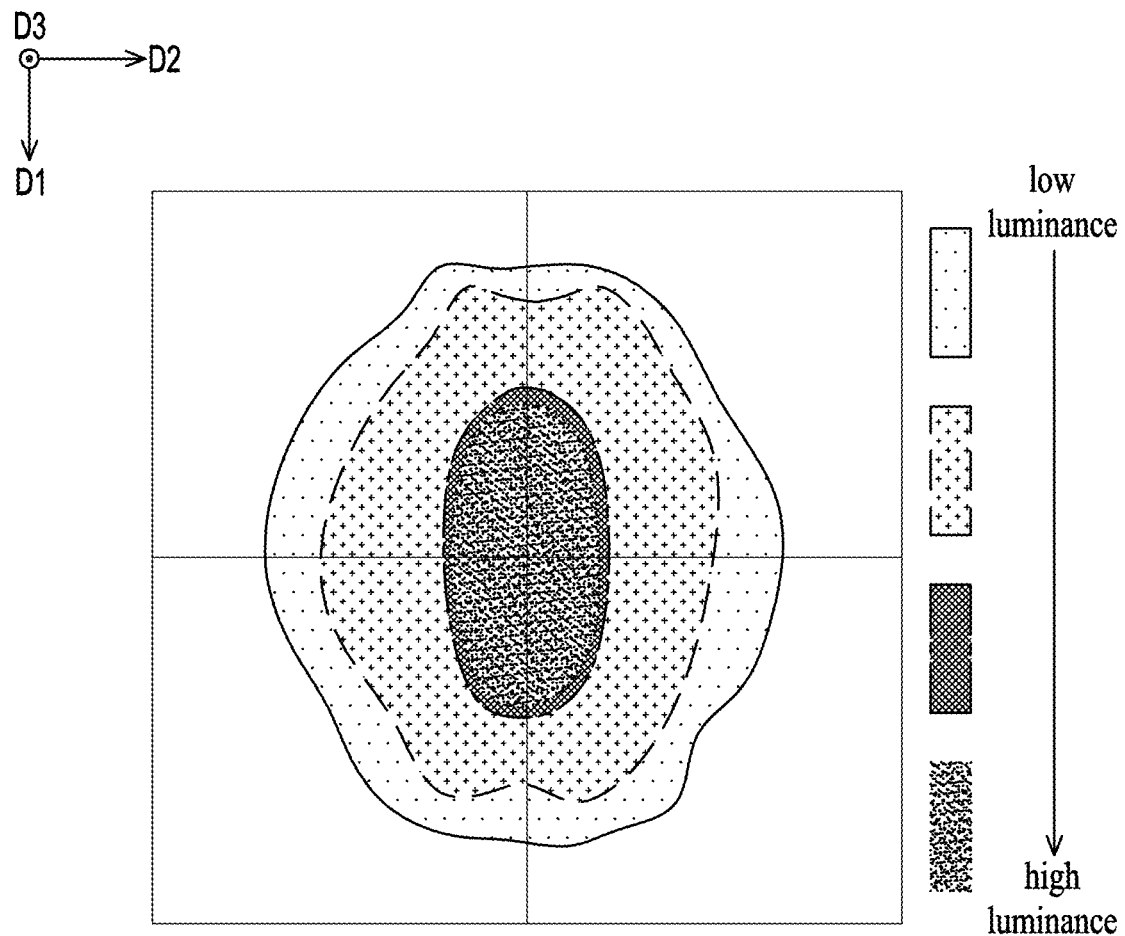
FIG. 3C is a schematic diagram of a light field of backlight passing through an optical film according to an embodiment of the disclosure.

Next, please refer to FIG. 3A, FIG. 3B, and FIG. 3C. FIG. 3A is a schematic diagram of a display device according to an embodiment of the disclosure. FIG. 3B is a schematic diagram of an optical film of the display device of FIG. 3A. FIG. 3C shows a schematic diagram of a light field of a display device configured with the optical film of FIG. 3B.

A display device 2 includes a self-luminous display panel 30 and an optical film set. The self-luminous display panel 30 has multiple pixel units PX. The optical film set is disposed on a display surface of the self-luminous display panel 30 and includes an optical film 500. The optical film 500 includes a first base 501 and a first light-guiding layer 502. The first light-guiding layer 502 includes multiple first light-guiding structures MS5. The first base 501 has a first light entrance surface 501A and a first light exit surface 501B opposite to each other. The first light-guiding structures MS5 are disposed on the first light entrance surface 501A of the first base 5010. Each of the first light-guiding structures MS5 includes two first light-guiding surfaces S5 opposite to each other, and a first included angle θ5 is between each of the two first light-guiding surfaces S5 and a normal N of the first base 501. The self-luminous display panel 30 is disposed on the side of the first light entrance surface 501A away from the first light exit surface 501B. The each of the first light-guiding structures MS5 further includes a first plane P5 connected between the two first light-guiding surfaces S5. The first plane P5 is perpendicular to the normal N of the first light entrance surface 501A, and the first plane P5 is parallel to the first light entrance surface 501A of the first base 501. The first light-guiding structures MS5 may be spaced apart. In other words, the first light entrance surface 501A is exposed between adjacent first light-guiding structures MS5. In some embodiments, the spatial distribution period (pitch) of the first light-guiding structures MS5 in the second direction D2 is 8 microns to 12 microns.

Referring to FIG. 3B, image light I0 from the self-luminous display panel 30 includes front-viewing light I1 and oblique light I2, and passes through the first light-guiding layer 502 and the first base 501 in sequence. It should be further explained that an included angle between the front-viewing light I1 emitted from the self-luminous display panel 30 and the normal N of the first light entrance surface 501A ranges from 0 to 5 degrees, and an included angle between the oblique light I2 emitted from the self-luminous display panel 30 and the normal N of the first light entrance surface 501A ranges from 5 to 30 degrees. In this embodiment, the first light-guiding structures MS5 of the optical film 500 are disposed on the first light entrance surface 501A of the first base 501, the first light-guiding structures MS5 extend toward the first direction D1, and a part of the front-viewing light I passes through the first plane P5 or a part of the first light entrance surface 501A. Thus, the part of the front-viewing light I1 remains as front-viewing light after passing through the optical film 500. In other words, an included angle between the part of the front-viewing light I1 after passing through the optical film 500 and the normal N of the first light entrance surface 501A in the second direction D2 is almost consistent with the included angle between the part of the front-viewing light I1 emitted from the self-luminous display panel 30 and the normal N of the first light entrance surface 501A. For the oblique light I2 provided by the self-luminous display panel 30, since each of the first light-guiding surfaces S5 is tilted with respect to the normal N of the first base 501, the oblique light I2 is recycled toward the self-luminous display panel 30 after being reflected and refracted or refracted several times in the optical film 500, and then emitted from the optical film 500 in a direction that is nearer to the front-viewing direction after being reflected by the reflective member inside the self-luminous display panel 30. In other words, after the oblique light I2 passes through the optical film 500, the included angle between the oblique light I2 and the normal of the first light entrance surface 501A becomes smaller in the second direction D2. That is, by arranging the optical film 500 as shown in FIG. 3B in the display device 2, the front-viewing luminance may be effectively increased.

Specifically, referring to FIG. 3C, FIG. 3C shows a schematic diagram of a light field of a display device 2 configured with the optical film of FIG. 3B. In FIG. 3C, areas filled with the same grid pattern indicate areas with similar light field energy values, and areas with a denser distribution of nets in the grid pattern indicate areas with higher light field energy values (i.e., areas with higher luminance values). As shown in FIG. 3C, based on the structural characteristics of the optical film 500 in this embodiment, when oblique light I2 passes through the optical film 500, the light field energy distribution of the oblique light I2 in the second direction D2 may be converged. Compared with a self-luminous display panel without other optical films, in this embodiment, the luminance gain of the image light I0 after passing through the optical film 500 is 1.33 times. According to some embodiments of the disclosure, when an angle range of the included angle θ5 between the each of the first light-guiding surfaces S5 and the normal N of the first base 501 is greater than 0 degrees and less than 25 degrees, the optical film 500 may provide good optical effects. To further illustrate, when the included angle θ5 between the each of the first light-guiding surfaces S5 and the normal N of the first base 501 is greater than 5 degrees and less than 20 degrees, the optical film 500 has better optical effects. In some embodiments, the light-guiding layer 502, the base 501, or a combination thereof can be fogged to avoid Mura fringes appearing in the image of the display device 2.

In some embodiments of the disclosure, a display device is provided, including a self-luminous display panel 30 and an optical film set. The optical film set is disposed on a display surface of the self-luminous display panel 30, and the optical film set includes two optical films 500. Multiple light-guiding structures MS5 of the two optical films 500 are disposed on the first light entrance surface 501A of the first base 501. Each of the first light-guiding structures MS5 of one of the optical films 500 is a strip structure extending toward the first direction D1, and each of the first light-guiding structures MS5 of another optical film 500 is a strip structure extending toward the second direction D2. The first direction D1 is perpendicular to second direction D2. Accordingly, a front-viewing luminance gain effect is produced in both the first direction D1 and the second direction D2. The only difference between this embodiment and FIG. 3A to FIG. 3C is that two optical films 500 are used, and the first light-guiding structure MS5 of the two optical films 500 extends in different directions. Thus, the schematic diagram is not drawn separately.

Figure 4:
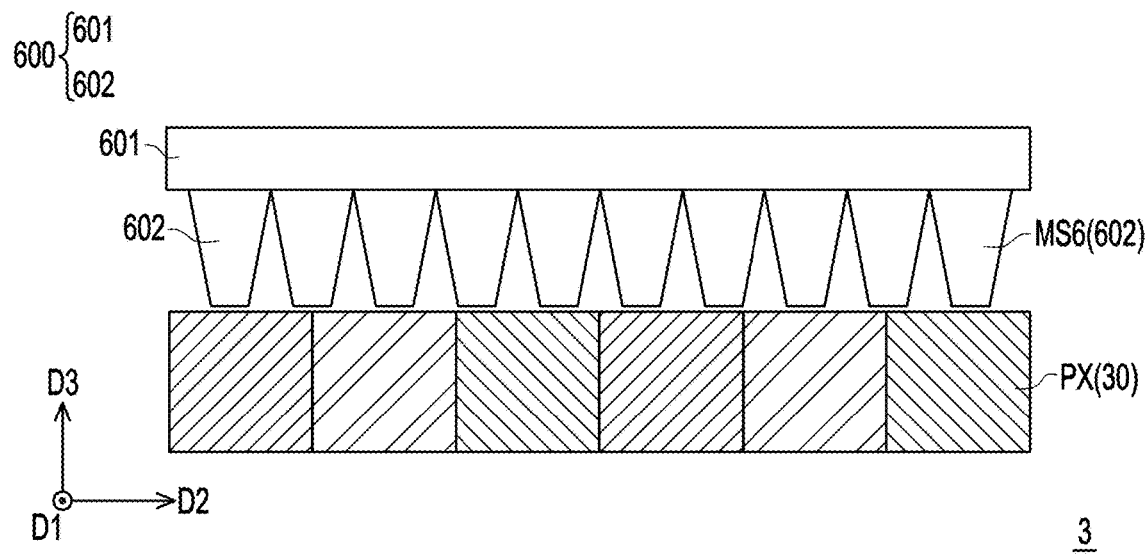
FIG. 4 is a schematic diagram of a display device according to an embodiment of the disclosure.

Referring to FIG. 4, according to another embodiment of the disclosure, a display device 3 is provided, including a self-luminous display panel 30 and an optical film set. The optical film set is disposed on a display surface of the self-luminous display panel 30, and the optical film set includes an optical film 600. The optical film 600 includes a first base 601 and a first light-guiding layer 602. The first light-guiding layer 602 includes multiple first light-guiding structures MS6. The optical film 600 of this embodiment is different from the optical film 500 in that the first light-guiding structures MS6 are connected to each other at a side connecting the first base 601.

Figure 5:
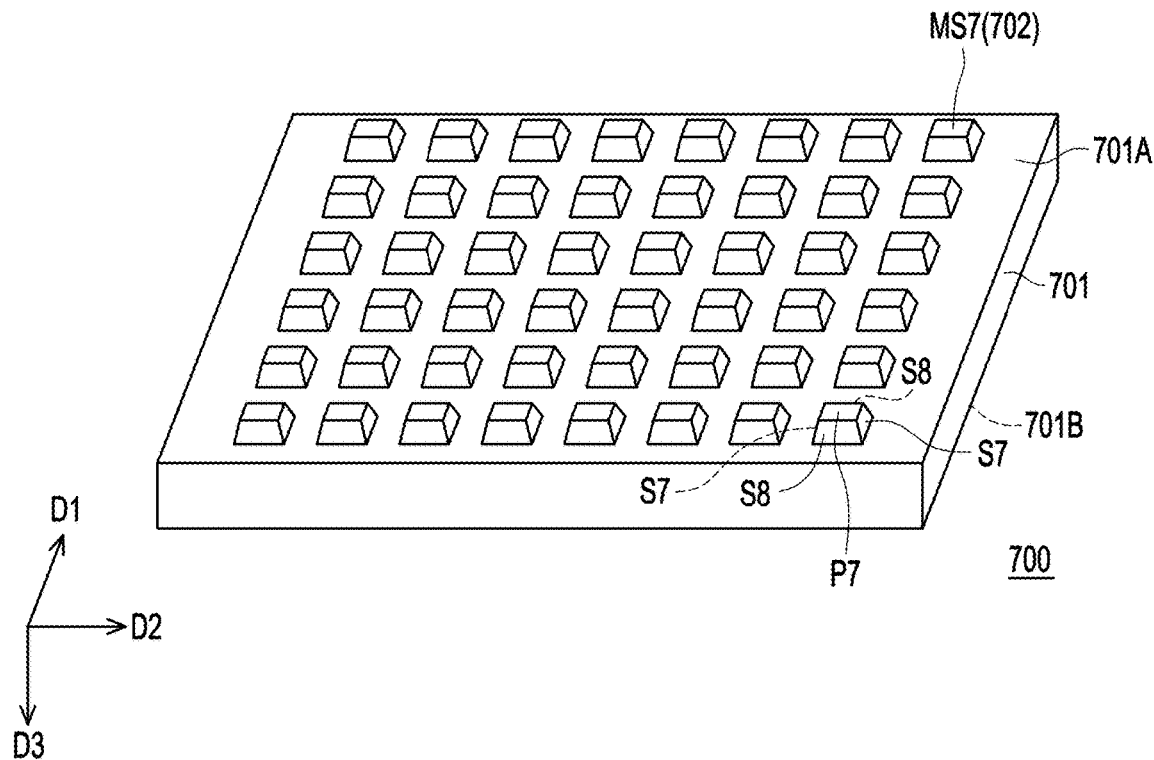
FIG. 5 is a schematic diagram of an optical film according to an embodiment of the disclosure.

Referring to FIG. 3A and FIG. 5 simultaneously, according to an embodiment of the disclosure, a display panel is provided, including a self-luminous display panel 30 and an optical film set. The optical film set is disposed on a display surface of the self-luminous display panel 30, and the optical film set includes an optical film 700. The optical film 700 includes a first base 701 and a first light-guiding layer 702. The first light-guiding layer 702 includes multiple first light-guiding structures MS7. The first base 701 has a first light entrance surface 701A and a first light exit surface 701B opposite to each other. The first light-guiding structures MS7 are disposed on the first light entrance surface 701A of the first base 701. Each of the first light-guiding structures MS7 includes two first light-guiding surfaces S7 opposite to each other and two first light-guiding surfaces S8 opposite to each other. In the same first light-guiding structure MS7, each of the two first light-guiding surfaces S7 has a first included angle greater than 0 degrees and less than 25 degrees with the normal (not shown) of the first light entrance surface 701A, each of the two first light-guiding surfaces S8 has a first included angle greater than 0 degrees and less than 25 degrees with the normal (not shown) of the first base 701. It should be further explained that when the first included angle between the first light-guiding surface S7 and the normal is greater than 5 degrees and less than 20 degrees, and the first included angle between the first light-guiding surface S8 and the normal is greater than 5 degrees and less than 20 degrees, the optical film 700 has better optical effects. The self-luminous display panel 30 is disposed on the side of the first light entrance surface 701A away from the first light exit surface 701B. The each of the first light-guiding structures MS7 further includes a first plane P7 connected between the two first light-guiding surfaces S7 and the two first light-guiding surfaces S8. The first plane P7 is perpendicular to the normal of the first light entrance surface 701A, and the first plane P7 is parallel to the first light entrance surface 701A. It should be further explained that the first light-guiding structures MS7 may be spaced apart, that is, part of the first light entrance surface 701A is exposed between adjacent first light-guiding structures MS7.

In this embodiment, since the each of the first light-guiding surfaces S7 is tilted with respect to the normal of the first light entrance surface 701A, a front-viewing luminance gain effect may be produced in the second direction D2. Moreover, since the each of the first light-guiding surfaces S8 is tilted with respect to the normal of the first light entrance surface 701A, a front-viewing luminance gain effect may be produced in the first direction D1.

To sum up, the optical film set provided by the embodiments of the disclosure includes a base and multiple light-guiding structures. Each of the light-guiding structures includes two light-guiding surfaces opposite to each other. An included angle is between each of the first light-guiding surfaces and a normal of the base, and an angle of the included angle is greater than 0 degrees and less than 25 degrees. A backlight module configured with the optical film set may maintain the travelling direction of front-viewing (zero AOV) light of a backlight source, and turn oblique light of the backlight source toward the zero AOV. A self-luminous display device configured with the optical film set may maintain the travelling direction of front-viewing light of the self-luminous display panel, and cause oblique light to be recycled back to the self-luminous display panel, and then, after being reflected by a reflective member inside the self-luminous display panel, to be emitted in a direction closer to the front-viewing direction.

The forward description of the preferred embodiments of the disclosure has been presented for purposes of illustration and description. It is not intended to be exhaustive or to limit the disclosure to the precise form or to exemplary embodiments disclosed. Accordingly, the forward description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred example embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An optical film set, comprising:
    a first optical film, comprising:
        a first base, having a first light entrance surface and a first light exit surface opposite to each other; and
        a plurality of first light-guiding structures, disposed on the first light entrance surface of the first base, wherein each of the first light-guiding structures comprises two first light-guiding surfaces opposite to each other, a first included angle is between each of the two first light-guiding surfaces and a normal of the first light entrance surface, and an angle range of the first included angle is greater than 0 degrees and less than 25 degrees.

2. The optical film set according to claim 1, wherein the two first light-guiding surfaces of the each of the first light-guiding structures are connected to each other at a side away from the first light entrance surface.

3. The optical film set according to claim 1 further comprising a second optical film, wherein the second optical film and the first optical film overlap each other, the second optical film comprises a second base and a plurality of second light-guiding structures, the second base has a second light entrance surface and a second light exit surface, the second light entrance surface is located between the first light exit surface and the second light exit surface, and the second light-guiding structures are disposed on the second light exit surface.

4. The optical film set according to claim 3, wherein the each of the first light-guiding structures and each of the second light-guiding structures are strip structures extending in a first direction.

5. The optical film set according to claim 4 further comprising a third optical film and a fourth optical film, wherein
    the third optical film and the second optical film overlap each other, and the third optical film comprises:
        a third base, having a third light entrance surface and a third light exit surface opposite to each other, the third light entrance surface being located between the second light exit surface and the third light exit surface; and
        a plurality of third light-guiding structures, disposed on the third light entrance surface of the third base, wherein each of the third light-guiding structures comprises two third light-guiding surfaces opposite to each other, a second included angle is between each of the two third light-guiding surfaces and a normal of the third light entrance surface, and the second included angle is greater than 0 degrees and less than 25 degrees;

the fourth optical film and the third optical film overlap each other, and the fourth optical film comprises:
  a fourth base, having a fourth light entrance surface and a fourth light exit surface, the fourth light entrance surface being located between the third light exit surface and the fourth light exit surface; and
  a plurality of fourth light-guiding structures, disposed on the fourth light exit surface.

6. The optical film set according to claim 5, wherein the two third light-guiding surfaces of the each of the third light-guiding structures are connected to each other at a side away from the third light entrance surface.

7. The optical film set according to claim 5, wherein the each of the third light-guiding structures and each of the fourth light-guiding structures are strip structures extending in a second direction.

8. The optical film set according to claim 7, wherein an included angle between the first direction and the second direction is within a range of 70 degrees to 110 degrees.

9. The optical film set according to claim 8, wherein the first direction is orthogonal to the second direction.

10. The optical film set according to claim 1, wherein the each of the first light-guiding structures further comprises a first plane connected between the two first light-guiding surfaces, and the first plane is perpendicular to the normal of the first light entrance surface.

11. The optical film set according to claim 10, wherein the first light-guiding structures are spaced apart.

12. The optical film set according to claim 10, wherein the first light-guiding structures connect to the first base at a side, and the first light-guiding structures connect to each other at the side.

13. The optical film set according to claim 10, wherein the each of the first light-guiding structures further comprises two second light-guiding surfaces opposite to each other, a second included angle is between each of the two second light-guiding surfaces and a normal of the first light entrance surface, the second included angle is greater than 0 degrees and less than 25 degrees, and the first plane is connected between the two second light-guiding surfaces.

14. A display device, comprising:
  a liquid crystal display panel; and
  a backlight module, stacked with the liquid crystal display panel and comprising an optical film set, and the optical film set comprising:
    a first base, having a first light entrance surface and a first light exit surface opposite to each other; and
    a plurality of first light-guiding structures, disposed on the first light entrance surface of the first base, wherein each of the first light-guiding structures comprises two first light-guiding surfaces opposite to each other, a first included angle is between each of the two first light-guiding surfaces and a normal of the first light entrance surface, the first included angle is greater than 0 degrees and less than 25 degrees, wherein the liquid crystal display panel is disposed on a side of the first light exit surface away from the first light entrance surface.

15. A display device, comprising:
  a self-luminous display panel; and
  an optical film set, disposed on a display surface of the self-luminous display panel, and comprising:
    a first base, having a first light entrance surface and a first light exit surface opposite to each other; and
    a plurality of first light-guiding structures, disposed on the first light entrance surface of the first base, wherein each of the first light-guiding structures comprises two first light-guiding surfaces opposite to each other, a first included angle is between each of the two first light-guiding surfaces and a normal of the first light entrance surface, the first included angle is greater than 0 degrees and less than 25 degrees, and the self-luminous display panel is disposed on a side of the first light entrance surface away from the first light exit surface.

* * * * *